United States Patent
Hanyu (10) Patent No.: US 6,347,829 B1
(45) Date of Patent: Feb. 19, 2002

(54) ROOF CONSTRUCTION FOR VEHICLE USING THERMOPLASTIC RESIN ROOF PANEL

(75) Inventor: Atsushi Hanyu, Yokosuka (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/716,365

(22) Filed: Nov. 21, 2000

(30) Foreign Application Priority Data

Nov. 24, 1999 (JP) .......................................... 11-333393

(51) Int. Cl.⁷ ................................................ B60J 7/00
(52) U.S. Cl. ........................ 296/210; 296/901; 52/573.1
(58) Field of Search ................ 296/210, 901; 52/573.1

(56) References Cited

U.S. PATENT DOCUMENTS

| | | | | |
|---|---|---|---|---|
| 4,573,733 A | * | 3/1986 | Zaydel | 296/191 |
| 4,600,621 A | * | 7/1986 | Maurer et al. | 296/214 |
| 4,610,478 A | * | 9/1986 | Tervol | 296/214 |
| 4,946,225 A | * | 8/1990 | Jardin | 296/213 |
| 4,957,326 A | * | 9/1990 | Chiba et al. | 296/210 |
| 5,120,593 A | * | 6/1992 | Kurihara | 296/210 |
| 5,409,746 A | * | 4/1995 | Mimura | 296/93 |
| 6,135,535 A | * | 10/2000 | Tarahomi | 296/102 |
| 6,151,834 A | * | 11/2000 | Oami et al. | 296/216.06 |
| 6,224,308 B1 | * | 5/2001 | Bieber et al. | 410/129 |

FOREIGN PATENT DOCUMENTS

| | | | |
|---|---|---|---|
| EP | 0 366 045 | | 5/1990 |
| EP | 1 103 447 | * | 11/2000 |
| JP | 581102380 | | 6/1983 |
| JP | 61-11774 | | 1/1986 |
| JP | 61-117774 | | 7/1986 |
| JP | 62194980 | | 8/1987 |
| JP | 10 6878 | * | 1/1998 |
| JP | 2001 48056 | * | 2/2001 |

* cited by examiner

Primary Examiner—Joseph D. Pape
Assistant Examiner—Kiran B. Patel
(74) Attorney, Agent, or Firm—McDermott, Will & Emery (57) ABSTRACT

A roof construction for a vehicle is provided with a thermoplastic resin roof panel and a roof section of a body frame structure. The roof section has a wall inwardly of its periphery and a support flange extending from a lower end of the wall toward the periphery. The roof panel has an attachment flange on the support flange and held thereto by fasteners (or connectors). The roof construction can suppress inward displacement of the attachment flange caused due to deformation of the roof panel due to a considerable change in temperature.

20 Claims, 11 Drawing Sheets

ROOF CONSTRUCTION FOR VEHICLE USING THERMOPLASTIC RESIN ROOF PANEL

BACKGROUND OF THE INVENTION

The present invention relates to a roof construction for a vehicle, and more particularly to a roof construction having a plastic roof panel.

"Thermoplastic roof panel" is herein used to mean a roof panel of synthetic resin or a roof panel of thermoplastic resin.

JP-A 61-117774 Utility Model discloses a resin roof panel. According to this prior art, an inner side of a resin roof panel has ribs connected to a roof section of a body frame structure by pins. The construction is not satisfactory in eliminating appearance of residual deformation at ends of the ribs or inward displacement at edges of the resin roof panel upon deformation of the roof panel due to a great drop in environmental temperature.

SUMMARY OF THE INVENTION

It is an object of the present invention to provide a roof construction for a vehicle in which a resin roof panel is free from local displacement or local residual deformation.

According to one aspect of the present invention, there is provided a roof construction for a vehicle, comprising: a body frame structure; a resin roof panel including a major portion with bounds, extensions hanging down from said bounds of said major portion, and attachment flanges connected to lower portions of said extensions, respectively; a connector connecting at least one of said attachment flanges to one of said body frame structure; and a stopper suppressing inward displacements of said roof panel from an outer periphery thereof upon deformation of said roof panel due to a change in environmental temperature.

According to specific aspect of the present invention, there is provided a roof construction for a vehicle, comprising; a thermoplastic resin roof panel including a major portion with bounds, extensions hanging down from said bounds of said major portion, and attachment flanges connected to lower portions of said extensions, respectively; a metal body frame structure including a roof section with support flanges underlying said attachment flanges, respectively, said attachment flanges being formed with a plurality of holes; a connector extending through at least one said holes and connecting at least one of said attachment flanges to one of said support flanges, said extensions being so constructed and arranged as to move in directions allowing inward displacements of said major portion upon deformation of said major portion due to a change in environmental temperature; and means for suppressing displacements of said attachment flanges relative to said support flanges and said connector upon movements of said extensions in directions allowing inward displacements of said major portion.

BRIEF DESCRIPTION OF THE DRAWINGS

The invention will be further understood from the following description with reference to the accompanying drawings, in which.

DESCRIPTION OF THE PREFERRED EMBODIMENTS

Referring to the accompanying drawings, the like reference numerals and characters are used throughout all Figures to designate like parts or portions.

(First Preferred Embodiment)

Figure 1:
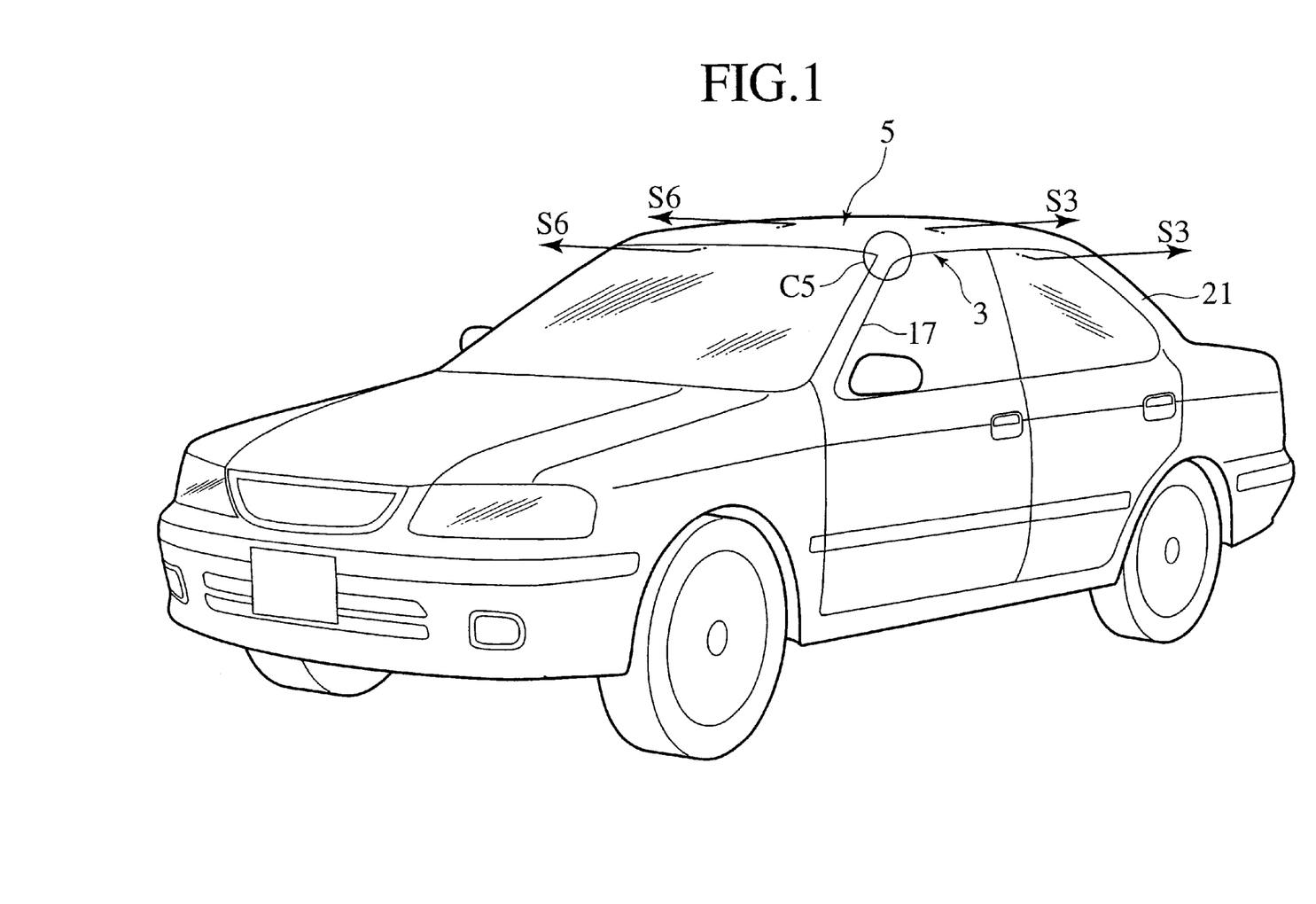
FIG. 1 is a perspective view of a motor vehicle with a roof construction according to the present invention.
Figure 2:
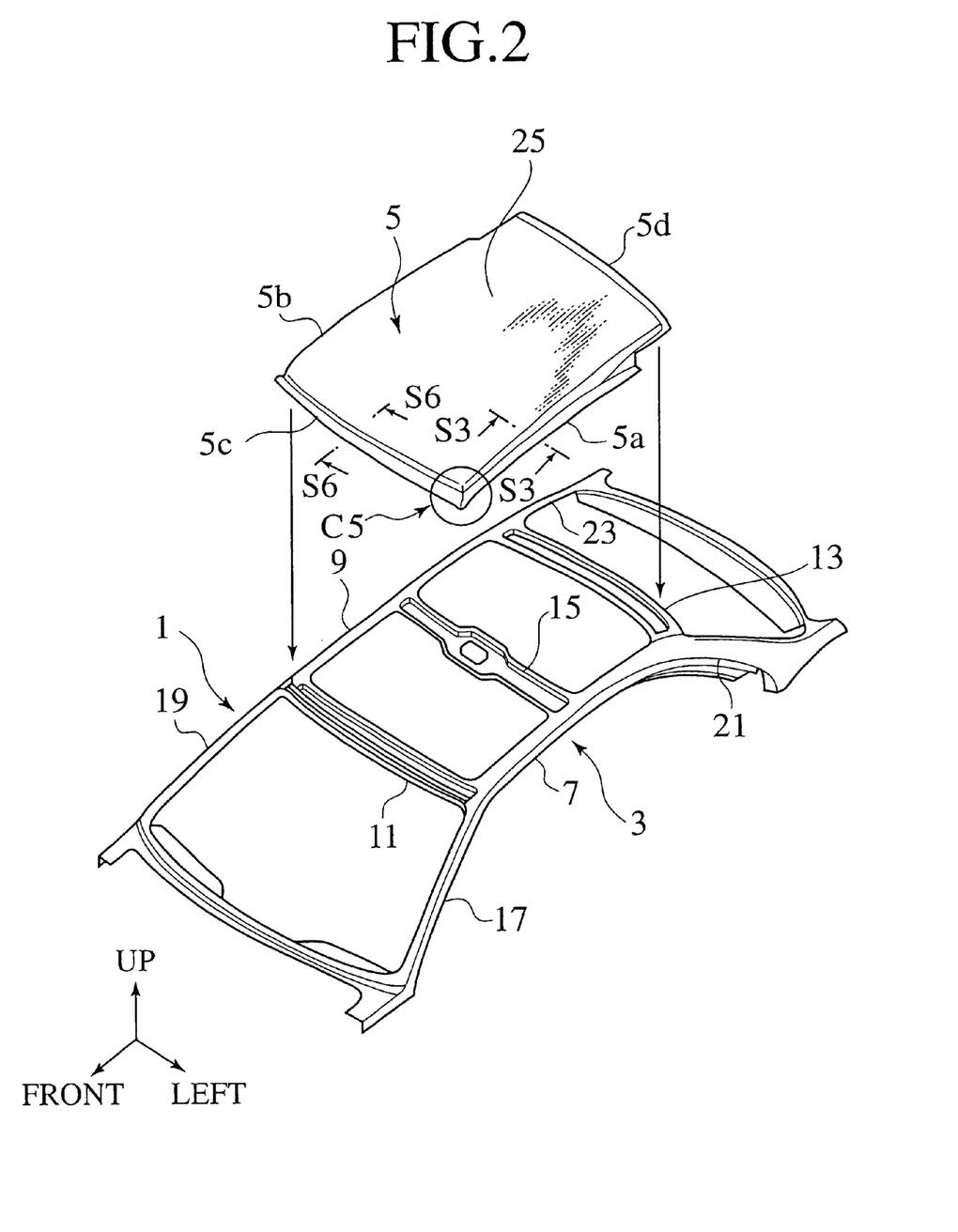
FIG. 2 is perspective view of a roof section of a body frame structure with a thermoplastic roof panel separated.
Figure 3:
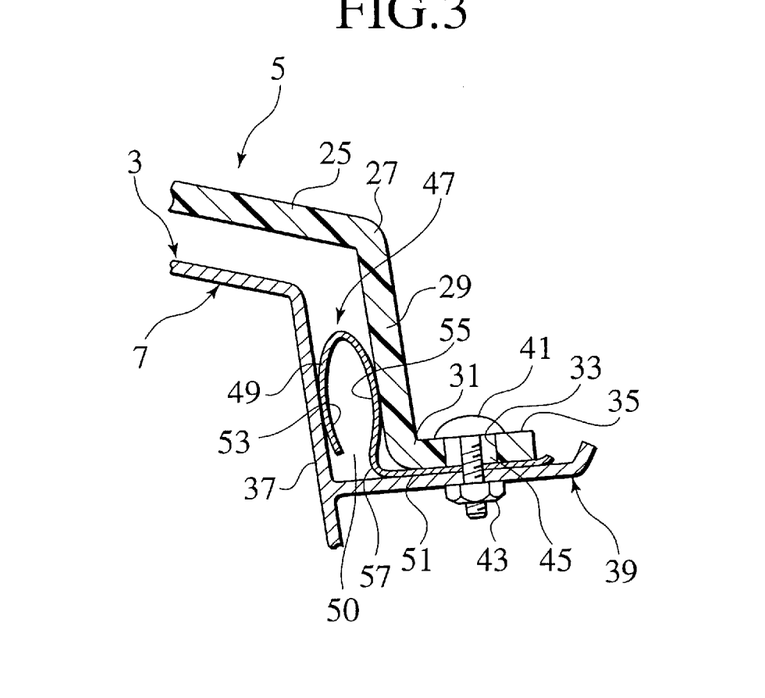
FIG. 3 is a cross sectional view taken through the line S3—S3 in FIGS. 1 and 2, showing a portion of the roof construction at normal temperature.
Figure 5:
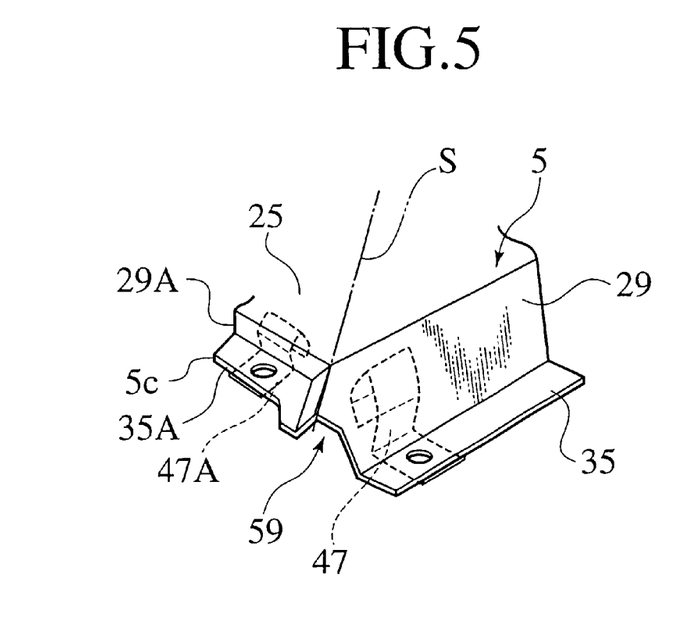
FIG. 5 is a view encircled by a circle C5 in FIGS. 1 and 2, showing a front left corner portion of the roof panel.
Figure 6:
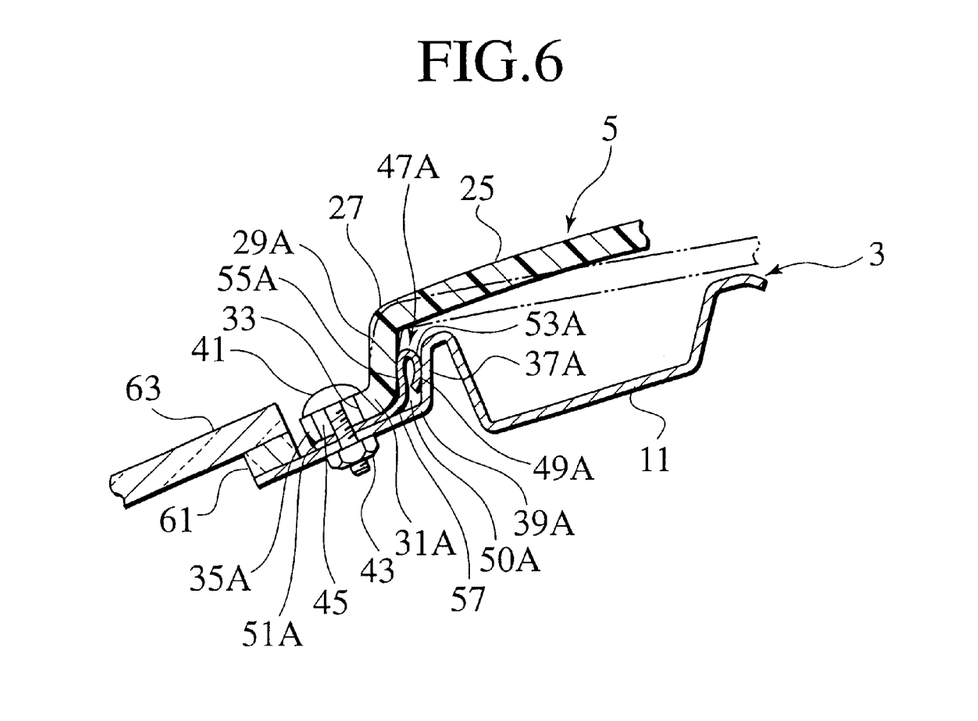
FIG. 6 is a cross sectional view taken through the line S6—S6 in FIGS. 1 and 2, showing another portion of the roof construction.

Referring to FIGS. 1, 2, 3, 5 and 6, FIG. 1 is a perspective view of a motor vehicle embodying the present invention, FIG. 2 is an exploded view of a plastic roof panel 5 and a metal body frame structure 1, FIG. 3 is a cross section taken though the line S3—S3 in FIG. 1, FIG. 5 is an enlarged view of a portion surrounded by a circle C5 in FIG. 1, and FIG. 6 is a cross section taken though the line S6—S6 in FIG. 1.

Referring to FIG. 2, a metal body frame structure 1 includes, as a structural part, a roof section 3. Metal body frame structure 1 may be made of, for example, steel or aluminum alloy or magnesium alloy. Roof section 3 includes a left side rail 7, a right side rail 9, a front roof rail 11, a rear roof rail 13, and a bow roof 15. Roof section 3 also includes a left front pillar 17, a right front pillar 19, a left rear pillar 21 and a right rear pillar 23. Side roof rails 7 and 9 extend from left and right end portions of front roof rail 11 to left and right end portions of rear roof rail 13, respectively. Bow roof 15 extends from a middle portion of left side rail 7 between front roof rail 11 and rear roof rail 13 to a middle portion of right side roof rail 9 between front roof rail 11 and rear roof rail 13. Front pillars 17 and 19 extend downwards from the left and right ends of front roof rail 11, respectively. Rear pillars 21 and 23 extend downwards from the left and right ends of rear roof rail 13, respectively. Although not shown, body structure 1 also includes other components, such as, for example, an engine compartment, a luggage compartment and a platform.

Roof panel 5 is made of thermoplastic resin. At its left, right, front and rear peripheries 5a, 5b, 5c and 5d, roof panel 5 is firmly connected to left, right, front and rear roof rails 7, 9, 11 and 13. Left, right, front and rear peripheries 5a, 5b, 5c and 5d extend along left, right, front and rear roof rails 7, 9, 11 and 13, respectively.

As seen from FIGS. 1, 2, 3, 5 and 6, roof panel 5 has a major portion 25 defining an upper roof contour of the motor vehicle. Major portion 25 has bounds 27 that are disposed inwardly from the outer periphery of the vehicle body. Roof panel 5 has two laterally spaced attachment flanges, only one being shown at 35 and two longitudinally spaced front and rear attachment flanges, only front one being shown at 35A, which extend along bounds 27, respectively. As best seen in FIGS. 3 and 6, roof panel 5 includes two lateral extensions, only one being shown at 29, and two front and rear extensions, one front extension being shown at 29A. The lateral, front and rear extensions 29 and 29A, for example, hang down from the corresponding bounds 27 of major portion 25 to the attachment flanges 35 and 35A, respectively. Viewing in FIG. 3, at its upper end, extension 29 is connected to the major portion 25 at angles to form a corner at bound 27. At its lower end, extension 29 is connected to the corresponding attachment flange 35 at angles to form a corner at a junction 31 between extension 29 and attachment flange 35. Viewing in FIG. 6, at its upper end, extension 29A is connected to major portion 25 at angles to form a corner at bound 27. At its lower end, extension 29A is connected to attachment flange 35A at angles to form a corner at a junction 31A between extension 29A and attachment flange 35A. Thermoplastic roof panel 5 is an integral piece formed by, for example, injection molding.

Side roof rails 7 and 9 are in mirror image relationship in structure with respect to the fore and aft direction of the motor vehicle. Accordingly, the following explanation as to and in association with side roof rail 7 is applicable in understanding side roof rail 9 and its relationship with roof panel 5.

As best seen in FIG. 3, side roof rail 7 has a longitudinally extending wall 37 disposed inboard and in spaced relationship with respect to extension 29 hanging down from the major portion 25. Side roof rail 7 has a support flange 39. Support flange 39 extends from wall 37 and underlies attachment flange 35. Wall 37 and extension 29 define therebetween a space 50 and support flange 39 closes lower side, viewing in FIG. 3, of space 50.

Front and rear roof rails 11 and 13 offer substantially the same relationship with roof panel. Accordingly, the following explanation as to and in association with front roof rail 11 is applicable in understanding rear roof rail 13 and its relationship with roof panel 5.

As best seen in FIG. 6, front roof rail 11 has a transversely extending wall 37A disposed inboard and in spaced relationship with respect to extension 29A hanging down from the major portion 25. Front roof rail 11 also has a support flange 39A. Support flange 39A extends from wall 37A and underlies attachment flange 35A. Wall 37A and extension 29A define therebetween a space 50A and support flange 39A closes lower side, viewing in FIG. 3, of space 50A.

Figure 9:
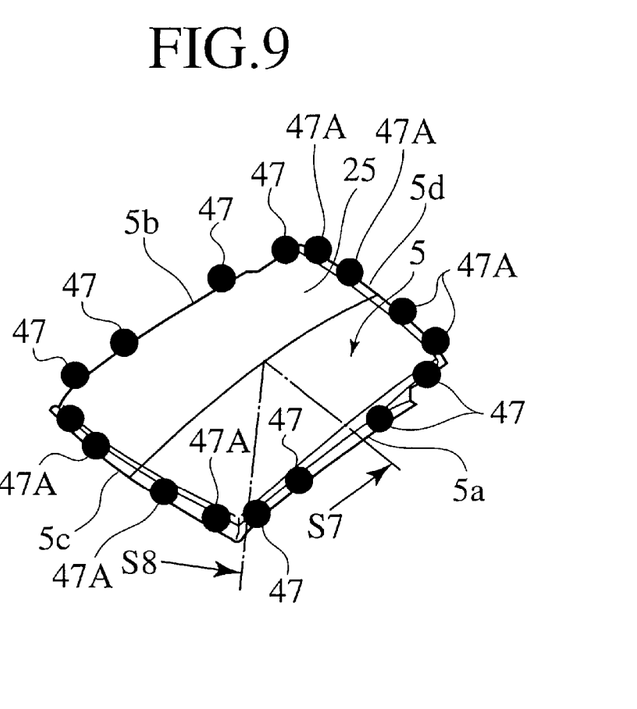
FIG. 9 is a pictorial view of the roof construction showing selected positions where retainers are to be disposed.

At selected positions, as indicated by dots in FIG. 9, the attachment flanges, for example, 35 and 35A are connected to the corresponding support flanges 39, respectively, by fasteners (or connectors), each in the form of a bolt 41 and a nut 43 in this embodiment (see FIGS. 3 and 6). Instead of bolts 41 and nuts 43, rivets may be used. If desired, an adhesive may be used in the place of or in cooperation with such fasteners (or connectors).

Referring to FIGS. 3 and 6, each of attachment flanges 35 and 35A is formed with holes 33 in which bars of the bolts 41 are disposed, respectively. There is an annular space 45 between each of the bars of the bolts 41 and the edge of the corresponding one of the holes 33. The setting is such that annular spaces 45 prevent or at least alleviate damage on the edges of holes 33, which might be imparted by the bars of bolts 41 during thermal displacement of roof panel 5. Such holes 33 may be replaced by cutouts cut inwardly from the periphery of each of the attachment flanges 35 and 35A.

At the selected positions as shown in FIG. 9, four retainers (or stoppers) 47 are provided for each of laterally spaced attachment flanges 35 and four retainers 47A are provided for each of longitudinally spaced attachment flanges 35A.

As best seen in FIG. 3, each retainer 47 is formed from a strip of spring steel. Retainer (or stopper) 47 has a flat seat or base section 51 and a C-shaped section 49 extending from the seat section 51 into space 50. The seat section 51 is interposed between attachment flange 35 and support flange 39 and held therebetween by tightening bolt 41. C-shaped section 49 has and thus may be divided into an outboard bow 55 connected via a junction 57 to and extending upwardly from seat section 51 and an inboard bow 53. Inboard bow 53 extends downwards from outboard bow 55 to form C-shaped section 49. Inboard bow 53 bears against longitudinally extending wall 37 and outboard bow 55 bears against extension 29 at a lower portion near attachment flange 35 to hold attachment flange 35 in the illustrated position in FIG. 3. The width of each retainer 47 along the longitudinal direction of each of longitudinally extending wall 37 may be appropriately determined. In this example, C-shaped section 49 offers the common elastic modulus throughout its width.

Retainers 47A are slightly different in dimension from retainers 47. However, both retainers 47 and 47A offer the same function.

As best seen in FIG. 6, each retainer 47A is formed from a strip of spring steel. Retainer 47A is substantially the same as retainer 47 and has a flat seat or base section 51A and a C-shaped section 49A extending from the seat section 51A into space 50A. The seat section 51A is interposed between attachment flange 35A and support flange 39A and held therebetween by tightening bolt 41. C-shaped section 49A has and thus may be divided into an outboard bow 55A connected via a junction 57 to and extending upwardly from seat section 51A and an inboard bow 53A. Inboard bow 53A extends downwards from outboard bow 55A to form C-shaped section 49A. Inboard bow 53A bears against longitudinally extending wall 37A and outboard bow 55A bears against extension 29A at a lower portion near attachment flange 35A to hold attachment flange 35A in the illustrated position in FIG. 6.

FIG. 5 is a magnified view of a portion surrounded by a circle S6 in FIG. 1 or 2. At this portion, extension 29 meets extension 29A. Viewing in FIG. 5, retainer 47 on the right-hand side is the same, in structure, as that shown in FIG. 3, while retainer 47A is the same, in structure, as that shown in FIG. 6.

Turning back to FIG. 6, support flange 39A, which is formed near the front edge of front roof rail 11, is connected to laterally extending wall 37A. Laterally extending wall 37A is elevated from the level of support flange 39A less than longitudinally extending wall 37 is elevated from the level of support flange 39. A front windshield 63 is connected via adhesive 61 to the support flange 39A at its front edge.

Comparing FIG. 6 with FIG. 3 clearly reveals that extension 29A is elevated from the level of attachment flange 35A less than extension 29 is elevated from the level of attachment flange 35. With regard to retainer 47A, its C-shaped section 49A extends from the level of seat section 51A less than C-shaped section 49 of retainer 47 extends from the level of seat section 51 (see FIG. 3).

Before pointing out various features according to the present invention, brief description is made as to the deformation mechanism of thermoplastic roof panel 5 under thermal stress at a considerable drop in environmental temperature. Such thermal stress causes displacement in a direction normal to the plane of major portion 25, a change in angle at bound 27, and inward displacement of attachment flanges 35 and 35A relative to support flanges 39 and 39A. The amount of such inward displacement of attachment flanges 35 and 35A is not negligible within area where structural rigidity is locally increased and at front and rear peripheries 5a and 5d. Structural rigidity of roof panel 5 is increased at a corner 59 where extensions 29 and 29A meet as shown in FIG. 5. Comparing FIG. 6 with FIG. 3 reveals that, at front and rear peripheries 5c and 5d of roof panel 5, major portion 25 is elevated from the level of attachment flange 35A less than it is elevated from the level of attachment flange 35. Within these portions of roof panel 5, upon a reduction in environmental temperature, thermal shrinkage of roof panel 5 at a drop in temperature causes a considerable reduction in thickness of attachment flanges 35 and 35A. The reduction in thickness creates clearances between attachment flanges 35, 35A and the heads of bolts 41, facilitating inward displacement of attachment flanges 35 and 35A. After such inward displacement of attachment flanges 35 and 35A from their originally set positions due to shrinkage, return movement of attachment flanges 35 and 35A to the originally set positions can hardly be expected after removal of such thermal stress. This is because increased resistance due to disappearance of the clearances hampers such return movement. If, in this manner, attachment flanges 35 and 35A fail to return to their originally set positions, major portion 25 of roof panel 5 may suffer from residual deformation.

According to the first embodiment of the present invention, the provision of extension 29 and retainer 47 (or 47A) expressly makes great contribution toward elimination of occurrence of residual deformation within thermoplastic roof panel 5.

Figure 4:
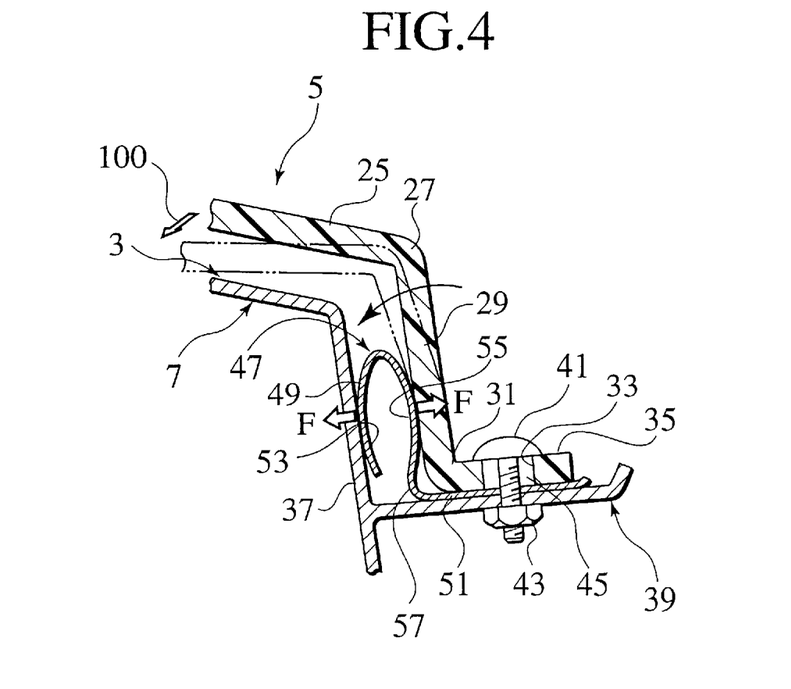
FIG. 4 is a similar view to FIG. 3, illustrating in two-dot chain line the position of parts at a very low temperature.

Referring to FIG. 4, the two-dot chain line illustrates the position which extension 29 of roof panel 5 will take under thermal stress at a considerable drop in environmental temperature. To allow a shift from an original position as indicated by the fully drawn line to a deformed position illustrated by the two-dot chain line, extension 29 expressly deviates from the original position in an inward direction as indicated by an arrow 100. Upon disappearance of such thermal stress, extension 29 is brought back to the original position. Extension 29 is so constructed and arranged as to expressly deviate from the original position, serving as a mechanism to allow deformation of roof panel 5. Although not illustrated, there occurs a clearance between the head of bolt 41 and attachment flange 35 owing to a reduction in thickness of attachment flange 35. The inward deviation of extension 29 tend to pull or move attachment flange 35 inwardly in a leftward direction viewing in FIG. 4, tending to compress C-shaped section 49 of retainer 47. Reaction forces in directions as indicated by arrows F created due to compression of C-shaped section 49 minimize the tendency to move attachment flange 35 inwardly. Accordingly, deviation of attachment flange 35 from the original position is prevented or at least minimized by the action of retainer 47 in this first preferred embodiment. Upon removal of thermal stress, C-shaped section 49 of retainer 47 pushes attachment flange 35 back to the original position. In addition to the action of retainer 47, support flange 39 guides and facilitate this return movement of attachment flange 35, assuring high reappearance of the original contour of roof panel 5 upon disappearance of thermal stress.

Transmission of stress to attachment flange 35 is remarkably reduced by displacement of major portion 25 out of its plane and a change in angle at bound 27 in the process of deformation upon considerable drop in environmental temperature. This reduction in stress transmission effectively prevents or at least minimizes occurrence of forces tending to move attachment flange 35. If the deformation and angle change are not enough for absorbing stress due to deformation, the remainder of stress spreads over the whole plane of major portion 25. Accordingly, the position of attachment flange 35 relative to support flange 39 is maintained before and after the thermal deformation, effectively suppressing (stopping) displacement, if any, of attachment flange 35. The reduced displacement can minimize a reduction in quality of external appearance, which otherwise would occur due to the recognizable displacement of attachment flange 35.

The remarkable reduction in displacement of attachment flange 35 can maintain annular space 45, thus minimizing the probability that the edge of hole 33 might strike the bar of bolt 41. Thus, attachment flange 35 will not be cracked around hole 33. Because the relative position of attachment flange 35 to support flange 39 is held, major portion 25 is always reinstated, in its contour, upon disappearance of thermal stress without any residual deformation.

Let it be assumed that the thermal deformation of roof panel 5 involves a small amount of inward displacement of attachment flange 35. In this case, in the process of reinstatement of roof panel 5 from the thermal deformation, there remain loose engagement between head of bolt 41 and nut 43 so that the spring action of retainer 47 in cooperation with the guide by support flange 39 may move attachment flange 35 back to the original position.

Upon completion of reinstatement of roof panel 5, the shrinkage of attachment flange 35 disappears so that the loose engagement between the head of bolt 41 and nut 43 disappears. Hence, attachment flange 35 is firmly held at the original position.

At an area around corner 59 of roof panel 5 (see FIG. 5) where rigidity is extremely high and an area where elevation of major portion 25 from attachment flange 35A is low (see FIG. 6), there may occur cases where the stress for thermal deformation cannot be absorbed by the deformation of major portion 25 and the angle change at bound 27, only. Upon occurrence of such cases, retainers 47A can effectively restrain attachment flanges 35A from displacing from their original positions. This suppresses the occurrence of residual deformation within major portion 25 and cracks around holes 33, thus making much contribution to maintenance of external appearance.

With the provision of retainers 47 and 47A, it has become easy to position roof panel 5 relative to roof portion 3 due to reaction forces imparted by C-shaped sections 49 and 49A of retainers 35 and 35A to walls 37, 37A and extensions 29, 29A. Roof panel 5 is held in the appropriate position relative to roof portion 3 in a stable manner, thus making it quite easy to conduct work by tightening bolts 41 with nuts 43. It is appreciated that, in this case, retainers 47 and 47A support extensions 29, 29A for positioning roof panel 5 relative to roof portion 3. If desired, C-shaped sections 49 and 49A may support extensions 29 and 29A relative to walls 37 and 37A to bias extensions 29 and 29A outwardly only when major portion 25 of roof panel 5 suffers from thermal deformation due to a drop ion temperature.

Figure 7:
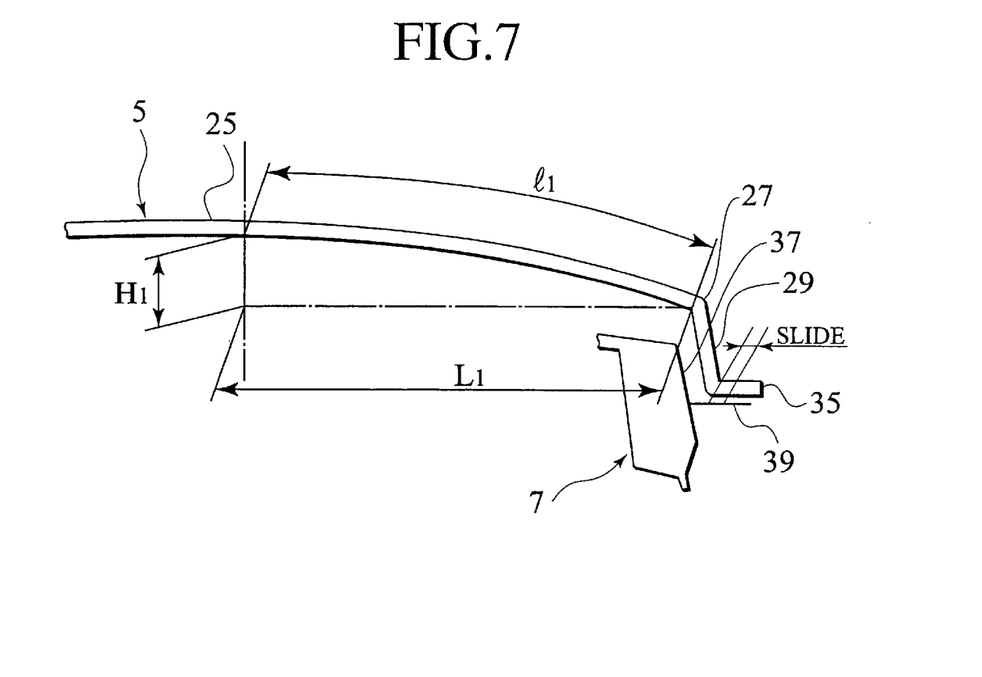
FIG. 7 is a pictorial view of a section along the line S7 in FIG. 9.
Figure 8:
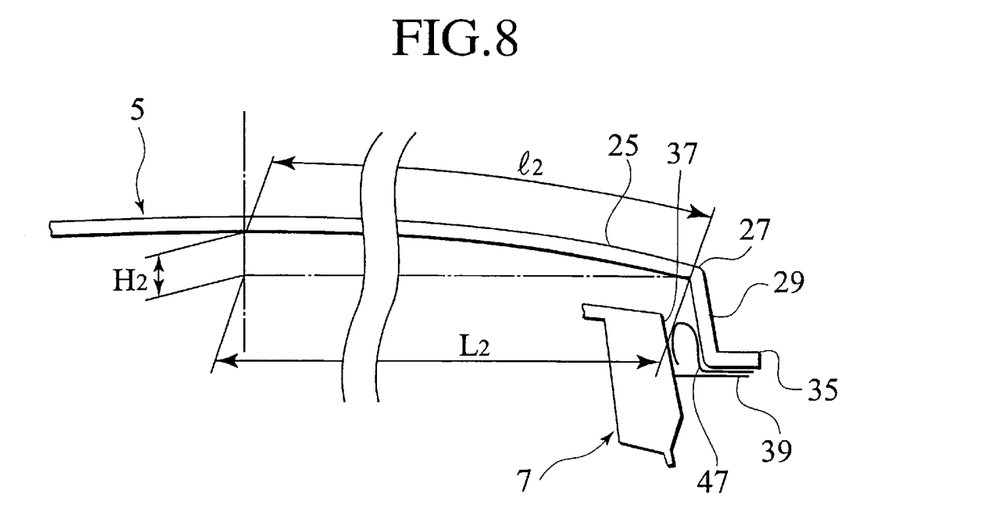
FIG. 8 is a pictorial view of a section along the line S8 in FIG. 9.

Referring to FIGS. 7 and 8, description is made on where to arrange retainers 47 and 47A in relation to the curvature of roof major portion 25. To evaluate the curvature for this purpose, the terminology "roof camber" is used herein to mean the curvature of a section taken through the central area portion of roof panel major portion 25 relative to its chord. Roof camber is expressed as the ratio of the height of the curved line between one edge and a point within the central area portion to the length of a line section between the one edge and a point vertically below the point within central area portion of a straight line between the one and opposite edges.

Referring to FIG. 9, it is assumed that major portion 25 of roof panel 5 has first and second curvatures at two different sections. The radius of the first curvature is less than that of the second curvature. The first section results from cutting roof panel along a transverse line SD between a middle point on a longitudinal line passing through the central area portion of major portion 25 and a first point on bound 27. The second section results from cutting roof panel 5 along an obligue line SC between the middle point on the longitudinal line and a second point on bound 27 near corner 59 (see FIG. 5). FIG. 7 illustrates the first section. In FIG. 7, l1 is the length of the first curvature from the first point on bound 27 to the middle point on the longitudinal line, L1 is the length of a line section between the first point on bound 27 and a point vertically below the middle point on the longitudinal line, and Hi is the height of the first curvature. The roof camber is expressed as H1/L1. FIG. 8 illustrates the second section. In FIG. 8, l2 is the length of the second curvature from the second point on bound 27 to the middle point on the longitudinal line, L2 is the length of a line section between the second point on the bound 27 and the point vertically below the middle point on the longitudinal line, and H2 is the height of the second curvature. The roof camber is expressed as H2/L2.

The allowable shrinkage $\delta$ is the maximum amount of shrinkage that may be absorbed by deformation in a direction to decrease roof camber. The first and second sections has different allowable shrinkages $\delta 1$ and $\delta 2$, which can be expressed as follows:

$$\delta 1 = l1 - L1$$

for the first section shown if FIG. 7, and $$\delta 2 = l2 - L2$$

for the second section shown if FIG. 8.

The roof camber of each section determines the allowable shrinkage. The greater the roof camber is, the greater the allowable shrinkage is. The roof camber for the first section is greater than the roof camber for the second section. Thus, $\delta 1$ is greater than $\delta 2$.

Let it be assumed that, upon a drop in temperature, the major portion 25 is subject to shrinkage D. In FIG. 7, if D is less than $\delta 1$, there is little force tending to move wall 29 inwardly. In this case, the amount of inward displacement of attachment flange 35 may be held within an allowable range. Thus, without relying on retainer 47, the attachment flange 35 is restrained from moving inwardly beyond the limit of the allowable range.

Referring to FIG. 8, if D is greater than $\delta 2$, thermal shrinkage of major portion 25 of roof panel 5 upon drop in temperature causes considerable displacement of wall 29, increasing the tendency to displace attachment flange 35 inwardly. Retainer 47 suppresses this tendency, thus preventing occurrence of cracks around hole 33 and residual deformation within major portion 25 during its reinstatement out of the thermal stress.

Simulation was conducted under the following conditions:

Referring to FIG. 9, roof panel 5 of thermoplastic resin was t4 thick, had Young's modulus $E_{roof}$=2000 MPa and line expansion coefficient $\alpha = 8 \times 10^{-5}$. The length of bound 27 lying in parallel to each of side, front and rear peripheries 5a, 5b, 5c, and 5d was 1200 mm.

In the section shown in FIG. 7, the height H1 was 50 mm, the length L1 was 500 mm, and the length l1 (el one) was 503.1 mm. Roof camber (H1/L1) was 0.10. Allowable shrinkage $\delta 1$ (=l1−L1) was 3.1 mm. In the section shown in FIG. 8, the height H2 was 50 mm, the length L2 was 780 mm, and the length l2 (el two) was 781.79 mm. Roof camber (H2/L2) was 0.064. Allowable shrinkage $\delta 2$ (=l2−L2) was 1.79 mm.

Figure 10:
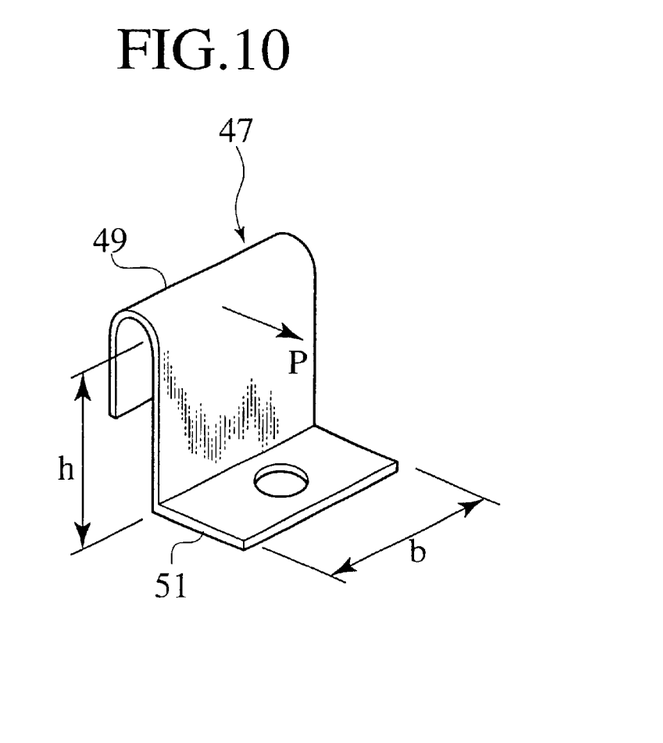
FIG. 10 is a pictorial view of a retainer used in simulation.

Retainer 47 as illustrated in FIG. 10 was used. Four of such retainers were disposed along each of four peripheries 5a, 5b, 5c, and 5d. Each retainer 47 of spring steel was t thick, and has Young's modulus $E_{retainer}$=206 MPa. Each retainer 47 was b=50 mm in width and h=20 mm in elevation from the level of sheet 51 to a level where reaction force P is applied to the adjacent extension 29.

The environmental temperature dropped by $\Delta T$ of 55° C. from 25° C. to −30° C.

In the section shown in FIG. 7, the shrinkage D1 caused by this temperature drop can be expressed as $$D1 = \alpha \times \Delta T \times L1 = 8 \times 10^{-5} \times 55 \times 500 = 2.2 \text{ mm}.$$

Thus, the displacement of attachment flange 35 can be expressed as the deviation $\Delta \delta 1$ of the shrinkage D1 from the allowable shrinkage $\delta 1$. $\Delta \delta 1 = D1 - \delta 1 = 2.2 - 3.1 = -0.90$ mm. There was no displacement of attachment flange 35 because the shrinkage D1 was allowed only by the vertical displacement of major portion 25. Thus, there is no need to provide retainer 47.

In the section shown in FIG. 8, the shrinkage D2 caused by this temperature drop can be expressed as $$D2 = \alpha \times \Delta T \times L2 = 8 \times 10^{-5} \times 55 \times 780 = 3.43 \text{ mm}.$$

Thus, the displacement of attachment flange 35 can be expressed as the deviation $\Delta \delta 2$ of the shrinkage D2 from the allowable shrinkage $\delta 2$. $\Delta \delta 2 = D2 - \delta 2 = 3.43 - 1.79 = 1.64$ mm. There was displacement of attachment flange 35 because the shrinkage D2 was not allowed only by the vertical displacement of major portion 25. This explains why roof retainer 47 is disposed between the lower portion of extension 29 of roof panel 5 and wall 37 of roof section 3 to suppress the displacement of attachment flange 35.

Through an area as expressed by the product of the length (=1200 m) of bound 27 and the thickness t4, stress is applied to extension 29 during shrinkage of major portion 25. As mentioned before, four retainers 47 support extension 29. Thus, an area A through which stress acts on each of the four retainers 47 can be expressed as $$A = 1200 \times t4 / 4$$

Thermal stress $\sigma$ can be expressed as $$\sigma = E_{roof} \times \epsilon,$$

where: $\epsilon$ is the ratio of $\Delta\delta2/L2$.

Since the reaction P of retainer 47 divided by the area A is opposed to the thermal stress, $$P/A = E_{roof} \times \Delta\delta2/L2.$$

Thus, the reaction P can be expressed as $$P = A \times E_{roof} \times \Delta\delta2/L2.$$

The spring constant K can be expressed as $$K = P/\Delta\delta2 = 3080 \text{ N/mm}.$$

Then, the required minimum thickness $t_{min}$ of retainer 47 can be expressed as $$t_{min} = \sqrt[3]{\{K \times 4 \times h^3 / (E_{retainer} \times b)\}} = 2.12 \text{ mm}.$$

Figure 11:
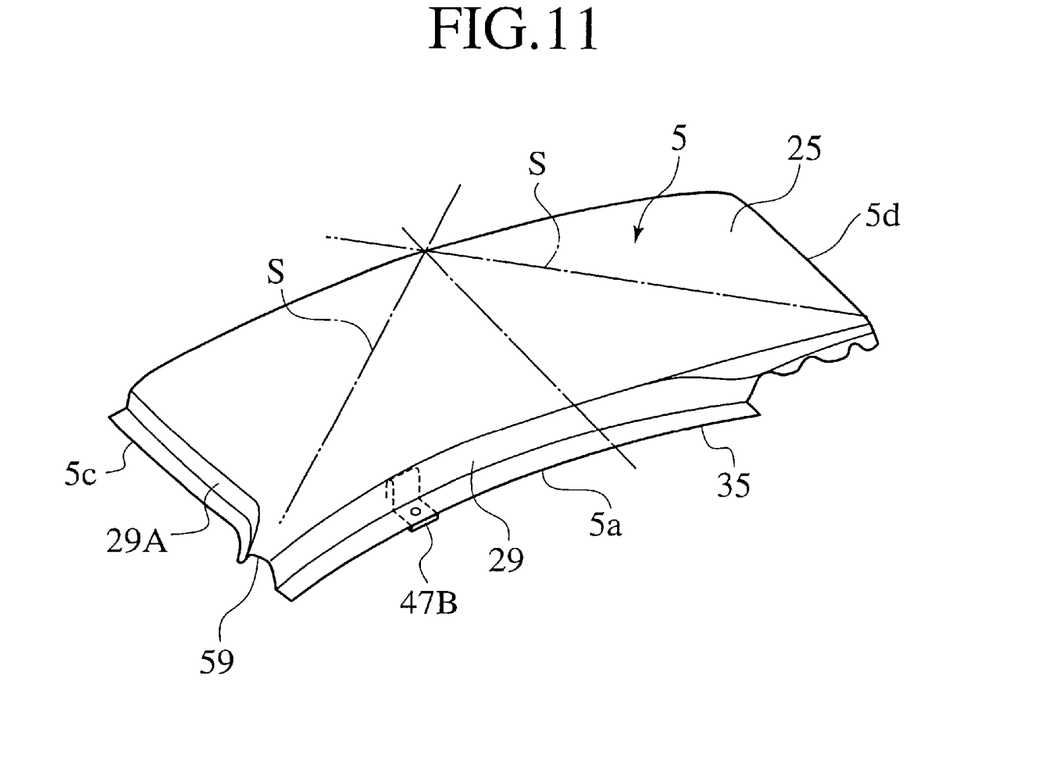
FIG. 11 is a perspective view of a left half of a thermoplastic resin roof panel.

Thus, the thickness t of retainer 47 must not be less than $t_{min}$. In this example, the thickness t is equal to or greater than 2.2 mm. The conducted simulation may be readily understood from the following Table:

In FIG. 11, a transverse line between the central point of major portion 25 and a point on the bound of major portion 25 near left periphery 5a of roof panel 5 represents an area where roof camber is relatively great, while a diagonal line S between the central point and a point on front corner 59 of major portion 25 and another diagonal line S between the central point and a point on rear corner of major portion 25 represent areas where roof cambers are relatively low. Allowable shrinkage within area represented by each of diagonal lines S is less than allowable shrinkage within area represented by the transverse line. During shrinkage of roof panel 5 upon a drop in environmental temperature, the inward displacement of attachment flange 35 within area represented by diagonal line S is greater than the inward displacement thereof within area represented by the transverse line.

Figure 12:
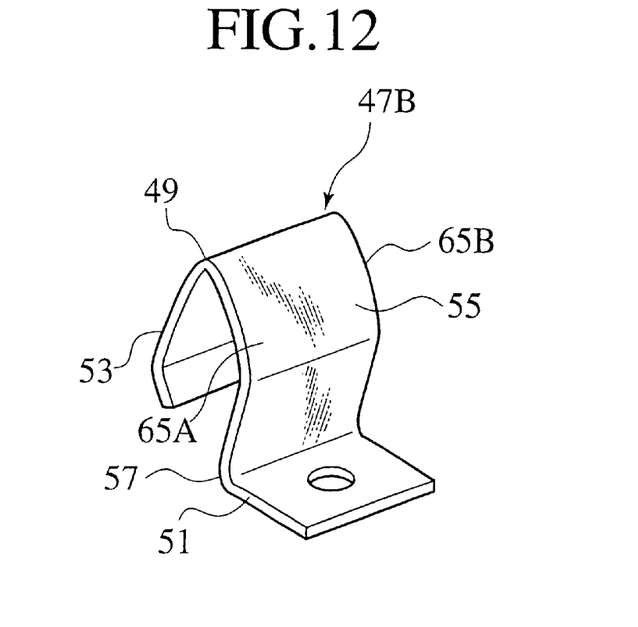
FIG. 12 is a view of a retainer used in FIG. 11.

In the second preferred embodiment, retainer 47B possesses two different settings for spring characteristic to support the lower portion of attachment flange 35 against different magnitudes of force tending to move attachment flange 35 inwardly. Referring to FIGS. 11 and 12, C-shaped section 49 may be dividable into and have a first half 65A extending inwardly from the side edge near diagonal line S

TABLE

| | Roof camber (H2/L2)<br>Small Camber | Roof Camber (H1/L2)<br>Large Camber |
|---|---|---|
| Shape of roof panel Embodiment | H2 = 50 mm<br>L2 = 780 mm<br>(H2/L2 = 0.064) | H1 = 50 mm<br>L1 = 500 mm<br>(H1/L1 = 0.10) |
| Allowable Shrinkage δ | l2 = 781.79 mm<br>δ 1 = l2 − L2 = 1.79 mm | l1 = 503.1 mm<br>δ1 = l1 − L1 = 3.1 mm |
| Material of roof panel Embodiment | Material: Thermoplastic resin<br>Young's modulus: $E_{roof}$ = 2000 MPa<br>Line expansion coefficient: $\alpha = 8 \times 10^{-5}$<br>Thickness: t4<br>Temperature condition: A drop from 25° C. to 30° C. ΔT = −55°C. | |
| Shrinkage D due to temp. drop | D2 = α × ΔT × L2 = 3.43 mm | D1 = α × ΔT × L1 = 2.2 mm |
| Sliding displacement Δ δ of attachment flange | Δ δ 2 = D2 − δ = 1.64 mm<br>Shrinkage D2 was not allowed only by the vertical displacement of major portion 25. This results in displacement of attachment flange 35. | Δ δ 1 = D1 − δ = −0.90 mm<br>Shrinkage D1 was allowed only by the vertical displacement of major portion 25. This results in no displacement of attachment flange 35. |
| Shape and material of retainer 47 | Material: Spring steel<br>Young's modulus: E = 206 MPa<br>Shape: b = 50 mm, h = 20 mm<br>Number: Four (4) retainers are provided per each side (bound 27) of roof panel.<br>Stress application area (A) needed by each retainer upon occurrence of stress within the roof panel. The length of bound 27 is 1200 mm.<br>A = 1200 × t4/4 = 1200 mm² | No retainers are provided because shrinkage is allowed only by the vertical displacement. |
| Thickness required by each retainer 47 | Thermal stress: σ = $E_{roof}$ × ε = $E_{roof}$ × Δ δ 2/L2<br>Reaction P per each retainer: P/A = $E_{roof}$ × Δ δ 2/L2, Thus,<br>P = A × $E_{roof}$ × δ 2/L2.<br>Spring constant: K = P/Δ δ 2 = 3080 N/mm<br>Minimum thickness: $t_{min} = \sqrt[3]{K \times 4 \times h^3 / E_{retainer} \times b}$<br>= 2.12 mm<br>Thus, the thickness t of each retainer 47 should be greater than 2.2 mm. | |

(Second Preferred Embodiment)

Referring to FIGS. 11 and 12, description on the second preferred embodiment is made. FIG. 11 shows a left half of roof panel 5 as divided by a longitudinal centerline that passes through a central point, i.e., a point within the central area of major portion 25. FIG. 12 is a perspective view of a retainer 47B used in this example. This third embodiment is substantially the same as the first preferred embodiment except spring characteristic imparted to retainer 47B.

and a second half 65B extending inwardly from the side edge near the transverse line. First and second halves 65A and 65B meet with each other at a midpoint between the two side edges. The two different settings for spring characteristic are such that the first half 65A provides greater reaction (hard spring setting) than the second half 65 does (less hard spring setting). Accordingly, retainer 47B can effectively suppress displacement of attachment flange 35 against two different forces, one along the transverse line, the other along the diagonal line S, acting on wall 29 (or 29A) during shrinkage of roof panel 5. Viewing in FIG. 12, first half 65A with hard spring setting extends along the left edge of retainer 47B, while second half 65B with less hard spring setting extends along the right side edge. Retainer 47B is not limited to this relationship. The present invention is intended to encompass a mirror image version of retainer 47B. The mirror image version retainer has a first half, with hard spring setting, extending along the right side edge of the retainer, and a second half, with less hard spring setting, extending along the right side edge.

In the illustration of FIG. 11, one retainer 47B of the kind shown in FIG. 12 is disposed to support the lower portion of extension 29 at a point between corner 59 and the point through which the transverse line passes. Four of such retainers and four of mirror image retainers may be provided, each supporting the lower portion of extension 29 (or 29A) at a point between one of the four corners of major portion 25 and a point through which the transverse line (or the longitudinal centerline) passes. It will be appreciated as an advantage of the second preferred embodiment that, with reduced number of retainers, the lower portion of extension 29 can be supported to suppress inward displacement of attachment flange 35.

Figure 13:
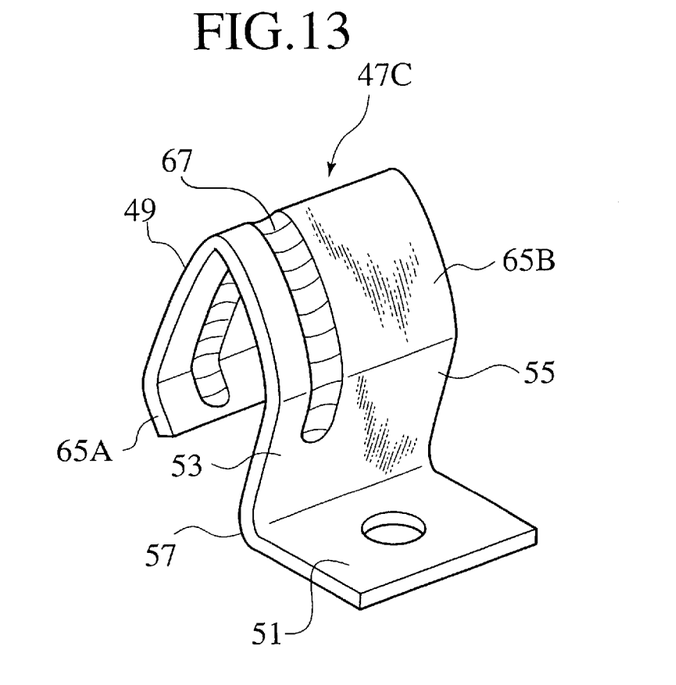
FIGS. 13 and 14 are view of modifications of the retainer shown in FIG. 12.
Figure 14:
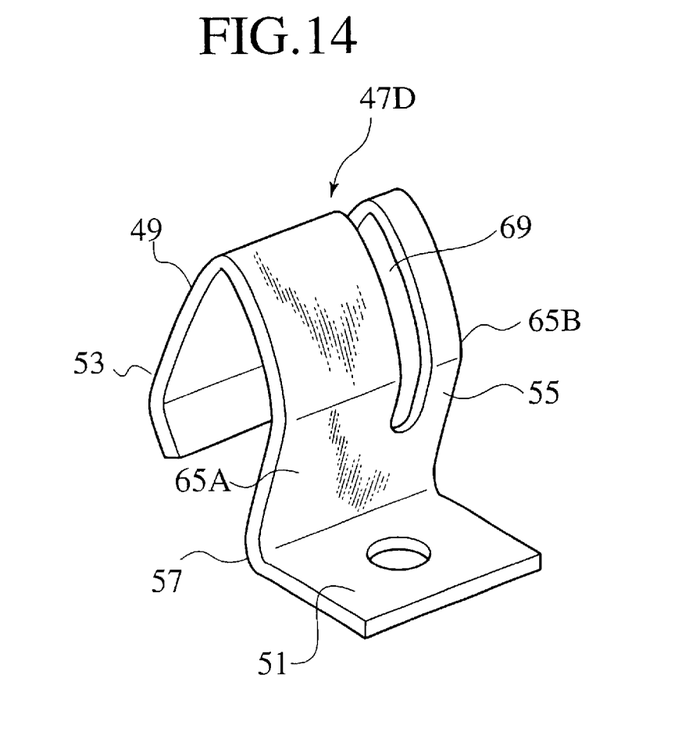

FIGS. 13 and 14 show modifications of retainer 47B.

A modified retainer 47C shown in FIG. 13 is substantially the same as retainer 47B but the provision of a bead 67. Bead 67 is disposed between the left side edge of retainer 47C and a midpoint between the left and right side edges to provide the required spring setting for first half 65A. Thus, first half 65A with bead 67 can provide greater reaction (hard spring setting) than second half 65B does (less hard spring setting).

Another modified retainer 47D shown in FIG. 14 is substantially the same as retainer 47B but the provision of a slit 69. Slit 69 is disposed between the right side edge of retainer 47D and a midpoint between the left and right side edges to provide the required spring setting for second half 65B. Thus, second half 65B with bead 69 can provide less great reaction (less hard spring setting) than first half 65A does (hard spring setting).

It will be appreciated as an advantage that the provision of bead 67 or slit 69 is a simple and easy measure to provide different spring settings required by first and second halves 65A and 65B in the version as shown in FIG. 13 or 14 as well as in its mirror version. If desired, it is also possible to provide such a bead 67 for hard spring setting required by first half 65A and to provide such a slit 69 for less hard setting required by second half 65B.

(Third Preferred Embodiment)

Figure 15:
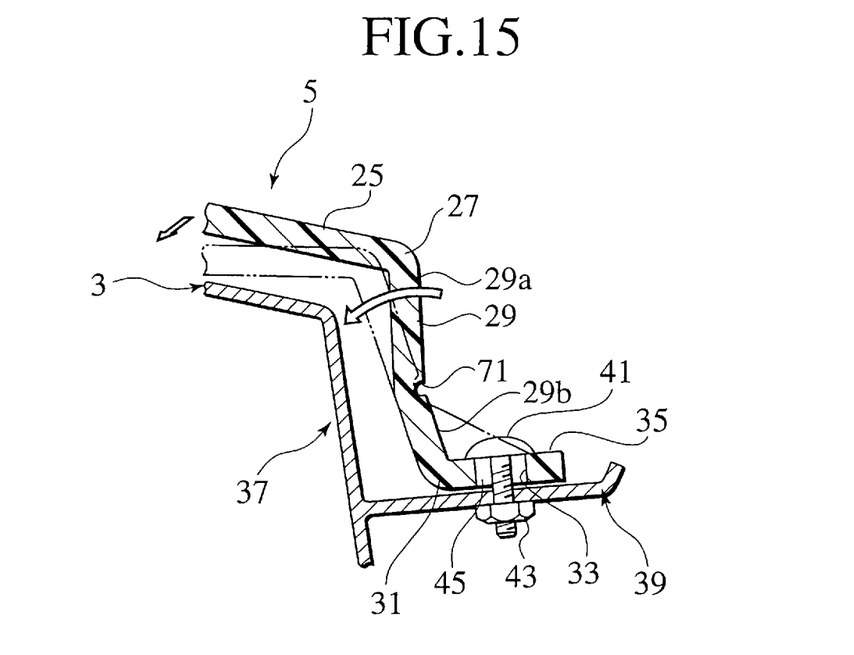
FIG. 15 is a similar view to FIG. 3, illustrating further preferred embodiment according to the present invention.
Figure 16:
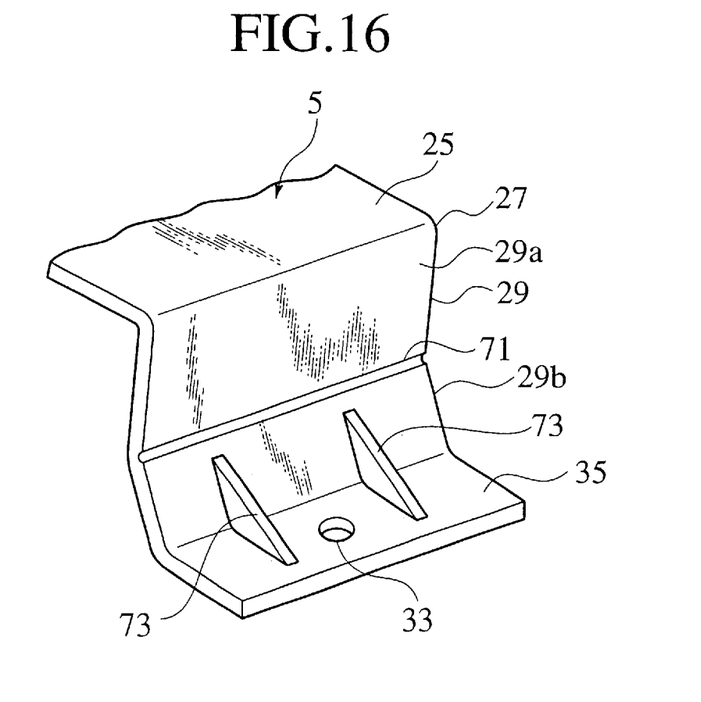
FIG. 16 is a fragmentary view of a portion of the roof panel used in FIG. 15.

Referring to FIGS. 15 and 16, description on the third preferred embodiment is made. The third preferred embodiment is substantially the same as the first preferred embodiment. But, the former is different from the latter in the manner of suppressing displacement of attachment flange 35. In the first preferred embodiment, retainers 47 are used to oppose the tendency of attachment flange 35 to displace, which tendency is caused by transmission of stress by extension 29 during shrinkage of major portion 25. In the third preferred embodiment, extension 29 is formed with a fold 71 along a line dividing an upper portion 29a from a lower portion 29b. The upper portion 29a is connected to a major portion 25 of a rood panel 5 at its bound 27. The lower portion 29b is connected to an attachment flange 35 to form a junction 31. As shown in FIG. 16, ribs 73 extend from lower portion 28b to attachment flange 35 to firmly hold the angled relationship between lower portion 29b and attachment flange 35. If this relationship can be held, the provision of such ribs is not required.

During shrinkage of roof panel 5 upon a drop in temperature, shrinkage of major portion 25, upper portion 28a of extension 29 tilts about fold 71 in a direction toward major portion 25 to allow shrinkage of major portion 25 to a position as illustrated by two-dot chain line. The provision of fold 71 facilitates this movement of upper portion 29a. In this process, lower portion 29b is firmly held relative to attachment flange 35, thus ensuring the tilting movement of upper portion 29a about fold 71.

This tilting movement of upper portion 28a about fold 71 effectively prevents or at least reduces transmission of stress to lower portion 29b, thus preventing or at least reducing occurrence of displacement of attachment flange 35. Accordingly, it is no longer required to rely mainly on retainers 47 to prevent or at least suppress displacement of attachment flange 35.

(Fourth Preferred Embodiment)

Figure 17:
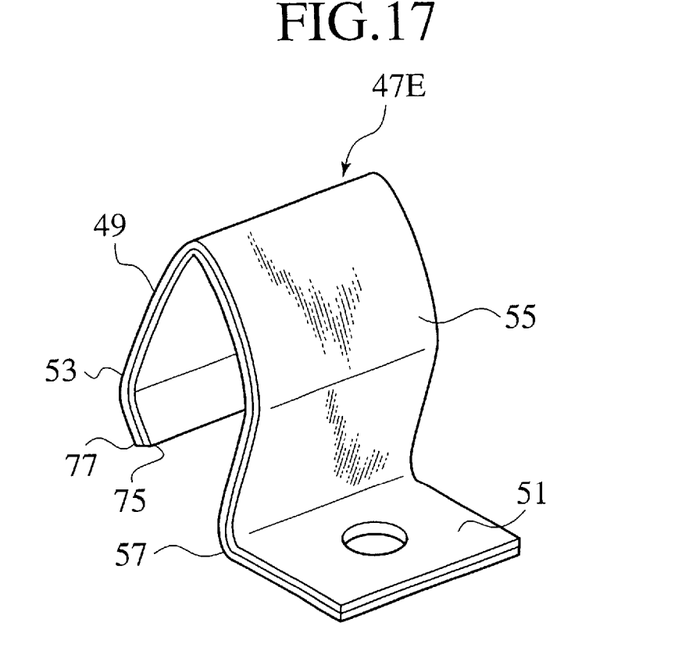
FIG. 17 is a view of still another retainer.
Figure 18:
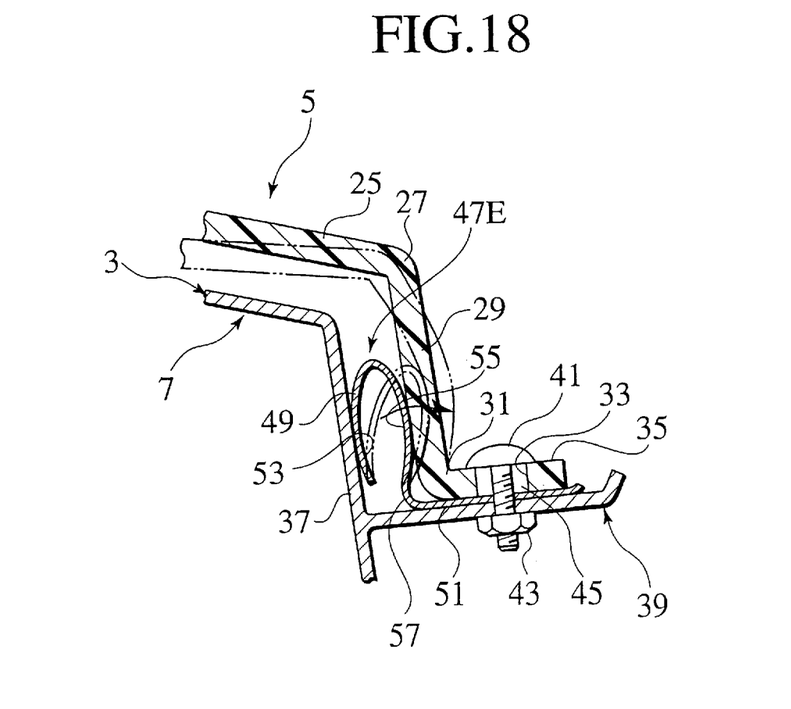
FIG. 18 is a view similar to FIG. 3, illustrating the position of the retainer shown in FIG. 17 at very low temperature.
Figure 19:
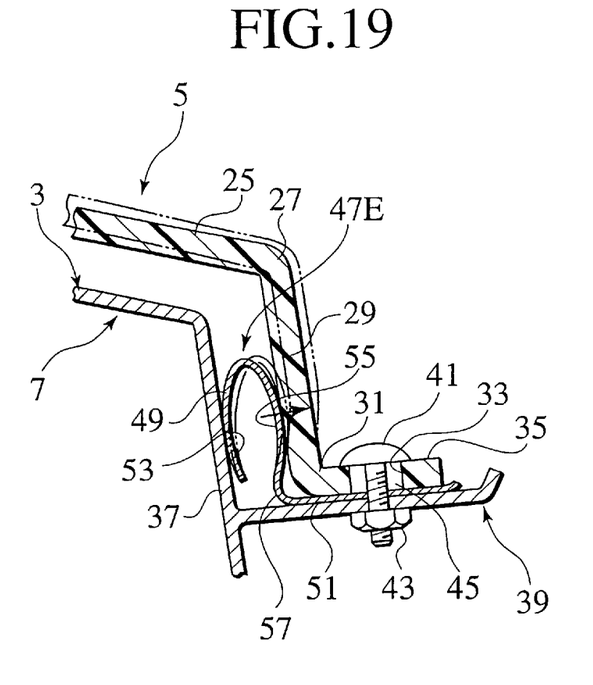
FIG. 19 is a view similar to FIG. 3, illustrating the position of the retainer shown in FIG. 17 at very high temperature.

Referring to FIGS. 17–19, description on the fourth preferred embodiment is made. FIG. 17 is a perspective view of a retainer 47E. In FIG. 18, the two-dot chain line shows the position of retainer 47E upon shrinkage of roof panel 5 at low temperature. In FIG. 19, the two-dot chain line shows the position of retainer 47E upon expansion of roof panel 5 at high temperature. In FIGS. 18 and 19, the fully drawn line shows the position of retainer 47E at normal temperature.

The fourth preferred embodiment is substantially the same as the first preferred embodiment except the use of retainer 47E instead of retainer 47. As shown in FIG. 17, retainer 47E is formed from a strip of a clad metal, which is a lower metal layer 75 in the form of, in this example, steel, overlaid on its upper side with an upper different metal layer 77 in the form of, in this example, aluminum alloy. The setting is such that the line expansion coefficient of lower metal layer 75 is smaller than that of upper metal layer 77. The upper metal layer 77 defines an outer side of C-shaped section 49 and an upper side of seat section 51.

As shown by two-dot chain line in FIG. 18, at cold temperature, because the line expansion coefficient of upper metal layer 77 is greater than that of lower metal layer 75, junction 57 changes, in shape, in a direction to decrease an angle between outboard bow 55 and seat section 51, thus inclining C-shaped section 49 toward seat section 51, biasing a lower portion of extension 29 outwardly. In this manner, the lower portion of extension 29 is firmly supported to hold extension 29 against tendency of attachment flange 35 to displace inwardly.

As shown by two-dot chain line in FIG. 19, at high temperature, because the line expansion coefficient of upper metal layer 77 is greater than that of lower metal layer 75, the radii of curvature of inboard and outboard bows 53 and 55 become small. Thus, C-shaped section 49 expands between wall 37 and lower portion of extension 29, biasing the lower portion of extension 29 against tendency of attachment flange 35 to move inwardly.

It will be appreciated as an advantage that, at normal temperature, C-shaped section 49 is at an upright and least expanded position as illustrated in FIG. 18 or 19 and free from the above-mentioned inclined or expanded position, making assembly of roof panel 5, retainers 47E and roof section 3 easy.

(Fifth Preferred Embodiment)

Figure 20:
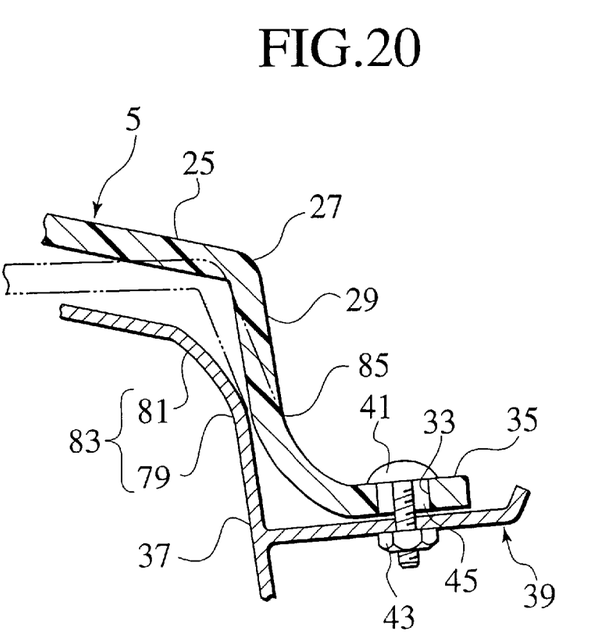
FIG. 20 is a view similar to FIG. 3, illustrating last preferred embodiment according to the present invention.

Referring to FIG. 20, description on the fifth preferred embodiment is made. The fifth preferred embodiment is substantially the same as the first preferred embodiment except the elimination of retainer 47. According to the fifth preferred embodiment, wall 37 supports a lower portion of extension 29. Wall 37 has an abutting portion 79 and an escape portion 81. Abutting portion 79 is arranged in the proximity of or in contact with a lower portion of extension 29. Escape portion 81 is disposed upwardly of abutting portion 79 and define a clearance space for allowing displacement of extension 29. In this example, abutting portion 79 and escape portion 81 cooperate with each other to define a curved stress control wall section 83. At a lower portion, extension 29 has a bulge 85 extending from attachment flange 35 toward wall section 83. With the provision of bulge 85, an upper portion of extension 29 extends upwardly.

Shrinkage of major portion 25 at low temperature causes bulge 85 to come into contact with abutting portion 79 on wall 37. The upper portion of extension is deformed within the clearance space defined by escape portion 81 as shown by the two-dot chain line for allowing inward displacement. Thus, the thermal stress is absorbed by downward displacement of major portion 25 and the displacement of the upper portion of extension 29. If the thermal stress remains, it is absorbed by angle change at bound 27 and spreading of stress over the whole plane of major portion 25. The transmission of the displacement of extension 29 to attachment flange 35 is suppressed by abutting portion 79 supporting bulge 85. Accordingly, displacement of attachment flange 35 is suppressed.

It will be appreciated as an advantage that the displacement of attachment flange 35 has been suppressed by simple modification of wall 37 of roof section 3.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 11-333393, filed Nov. 24, 1999, the disclosure of which is hereby incorporated by reference in its entirety.

What is claimed is:

1. A roof construction for a vehicle, comprising:
   a body frame structure;
   a resin roof panel including a major portion with bounds, extensions hanging down from said bounds of said major portion, and attachment flanges connected to lower portions of said extensions, respectively;
   a connector connecting at lest one of said attachment flanges to said body frame structure; and
   a stopper suppressing inward displacements of said roof panel from an outer periphery thereof upon deformation of said roof panel due to a change in environmental temperature.

2. A roof construction as claimed in claim 1, wherein said stopper includes a lower portion stopper supporting said extensions on a portion of said roof section near an outer periphery thereof to suppress movement of said lower portion of each of said extensions.

3. A roof construction as claimed in claim 2, wherein said lower portion stopper includes a support disposed between each of said extensions and the adjacent portion of said roof section near the outer periphery thereof to support said lower portion of each of said extensions on an adjacent portion of said roof section near the outer periphery thereof.

4. A roof construction as claimed in claim 3, wherein said support is resilient enough to bias the adjacent one of said attachment flanges in direction opposite to a direction in which said attachment flange may be displaced relative to the underlying support flange.

5. A roof construction as claimed in claim 4, wherein said support is in the form of a retainer, said retainer including a resilient C-shaped section disposed between said lower portion of each of said extensions and the adjacent portion of said roof section near the outer periphery thereof.

6. A roof construction as claimed in claim 5, wherein said retainer includes an integral seat section that is interposed between one of said attachment flanges and the underlying one of said support flanges and held in fixed relationship by said connector.

7. A roof construction as claimed in claim 6, wherein said retainer is formed from a strip of a clad metal, which is a lower metal layer overlaid on its upper side with an upper different metal layer, and wherein the line expansion coefficient of said lower metal layer is smaller than that of aid upper metal layer, and wherein said upper metal layer defines an outer side of said C-shaped section and an upper side of said seat section.

8. A roof construction as claimed in claim 5, wherein said retainer possesses two different settings for spring characteristic to support said lower portion of one of said attachment flanges against different magnitudes of force tending to move said attachment flange inwardly, and wherein said C-shaped section has a first half extending inwardly from one side edge of aid retainer and a second half extending inwardly from the opposite side edge, and wherein said first half provides greater reaction than said second half does.

9. A roof construction as claimed in claim 8, wherein said first half has a bead.

10. A roof construction as claimed in claim 8, wherein said second half is formed with a slit.

11. A roof construction as claimed in claim 2, wherein said stopper includes an abutting portion formed on said roof section which said lower portion of one of said extensions is in proximity with, and an escape portion, and wherein said escape portion is disposed upwardly of said abutting portion and defines a clearance space for allowing displacement of one of said extensions.

12. A roof construction as claimed in claim 11, wherein said abutting portion and said escape portion cooperate with each other to define a stress controlling wall section.

13. A roof construction as claimed in claim 1, wherein said stopper includes a deformable portion in one of said extensions along a line dividing said extension into an upper portion and a lower portion, and wherein said upper portion is connected to said major portion.

14. A roof construction as claimed in claim 13, wherein said deformable portion is a fold.

15. A roof construction as claimed in claim 14, wherein said lower portion is connected to one of said attachment flanges and ribs are provided to firmly hold relationship between said lower portion and said attachment flange.

16. A roof construction as claimed in claim 1, wherein said stopper is disposed near each corner of said roof section.

17. A roof construction as claimed in claim 1, wherein said stopper is disposed at least one of front and rear ends of said roof section.

18. A roof construction as claimed in claim 1, wherein said stopper is disposed at a portion of said roof panel which has a curvature with relatively great radius of curvature.

19. A roof construction for a vehicle, comprising;
   a thermoplastic resin roof panel including a major portion with bounds, extensions hanging down from said bounds of said major portion, and attachment flanges connected to lower portions of said extensions, respectively;

a metal body frame structure including a roof section with support flanges underlying said attachment flanges, respectively, said attachment flanges being formed with a plurality of holes;

a connector extending through at least one of said holes and connecting at least one of said attachment flanges to one of said support flanges, said extensions being so constructed and arranged as to move in directions allowing inward displacements of said major portion upon deformation of said major portion due to a change in environmental temperature; and means for suppressing displacements of said attachment flanges relative to said support flanges and said connector upon movements of said extensions in directions allowing inward displacements of said major portion.

20. A vehicle comprising:

a front body;

a rear body;

a body side; and a roof construction having;

a body frame structure;

a resin roof panel including a major portion with bounds, extensions hanging down from said bounds of said major portion, and attachment flanges connected to lower portions of said. extensions, respectively;

a connector connecting at lest one of said attachment flanges to said body frame structure; and a stopper suppressing inward displacements of said roof panel from an outer periphery thereof upon deformation of said roof panel due to a change in environmental temperature.

* * * * *